United States Patent
Ly et al.

(10) Patent No.: US 11,950,156 B2
(45) Date of Patent: Apr. 2, 2024

(54) TECHNIQUES FOR SHARING TRANSMISSION POWER DURING HANDOVER IN WIRELESS COMMUNICATIONS

(71) Applicant: QUALCOMM Incorporated, San Diego, CA (US)

(72) Inventors: Hung Dinh Ly, San Diego, CA (US); Peter Gaal, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 17/181,616

(22) Filed: Feb. 22, 2021

(65) Prior Publication Data
US 2021/0306923 A1  Sep. 30, 2021

Related U.S. Application Data

(60) Provisional application No. 62/994,264, filed on Mar. 24, 2020.

(51) Int. Cl.
| | |
|---|---|
| *H04W 72/00* | (2023.01) |
| *H04W 8/24* | (2009.01) |
| *H04W 36/18* | (2009.01) |
| *H04W 52/34* | (2009.01) |
| *H04W 72/1268* | (2023.01) |
| *H04W 72/23* | (2023.01) |

(52) U.S. Cl.
CPC ............. *H04W 36/18* (2013.01); *H04W 8/24* (2013.01); *H04W 52/346* (2013.01); *H04W 72/1268* (2013.01); *H04W 72/23* (2023.01)

(58) Field of Classification Search
CPC ..... H04W 36/18; H04W 8/24; H04W 52/346; H04W 72/1268; H04W 72/14; H04W 52/146; H04W 52/40
See application file for complete search history.

(56) References Cited

U.S. PATENT DOCUMENTS

| | | | |
|---|---|---|---|
| 2020/0288359 A1* | 9/2020 | Kim | H04W 36/0058 |
| 2020/0314716 A1* | 10/2020 | Kim | H04W 36/0079 |
| 2021/0282002 A1* | 9/2021 | Bire | H04W 28/0268 |

OTHER PUBLICATIONS

Intel474 (Intel Corporation: "Summary of Thursday offline discussion on physical layer aspects of NR mobility enhancement", R1-1913474—3GPP, Nov. 2019).*

(Continued)

*Primary Examiner* — Lakeram Jangbahadur
(74) *Attorney, Agent, or Firm* — ArentFox Schiff LLP

(57) ABSTRACT

This disclosure provides systems, methods and apparatus, including computer programs encoded on computer storage media, for cancelling transmissions during handover operations. In one aspect, a user equipment (UE) can cancel at least a portion of a first uplink transmission where the first uplink transmission overlaps with a second uplink transmission scheduled by a target cell in a dual active protocol stack (DAPS)-based handover (HO). In another aspect, a network can receive, from the UE, a capability indicating whether cancelling uplink transmission from a source cell in DAPS-based HO is supported, and the network can schedule an uplink transmission for the UE during the DAPS-based HO to the target cell based on the capability.

30 Claims, 7 Drawing Sheets

(56) References Cited

OTHER PUBLICATIONS

Intel200 (Intel Corporation: "Issue Summary for NR Mobility Enhancements", R1-2001200—3GPP, Feb. 2020).*
Intel Corporation: "Issue Summary for NR Mobility Enhancements", 3GPP Draft, R1-2001200, 3GPP TSG RAN WG1 Meeting #100-E, 3rd Generation Partnership Project (3GPP), France, vol. RAN WG1, No. e-Meeting, Feb. 24, 2020-Mar. 6, 2020, Feb. 22, 2020 (Feb. 22, 2020), XP051853738, 13 pages.
Intel Corporation: "Summary of Discussion on Physical Layer Aspects of NR Mobility Enhancement", 3GPP Draft, R1-1910687, 3GPP TSG RAN WG1 Meeting #98bis, Intel NR E-Mobilty Discussion Summary, 3rd Generation Partnership Project (3GPP), France, vol. RAN WG1, No. Chongqing, China, Aug. 14, 2019-Aug. 20, 2019, Oct. 22, 2019 (Oct. 22, 2019), XP051798599, 8 Pages.
Intel Corporation: "Summary of Thursday Offline Discussion on Physical Layer Aspects of NR Mobility Enhancement", 3GPP Draft, R1-1913474, 3GPP TSG RAN WG1 Meeting #99, 3rd Generation Partnership Project (3GPP), France, vol. RAN WG1, No. Reno, NV, U.S.A, Nov. 18, 2019-Nov. 22, 2019, Nov. 25, 2019 (Nov. 25, 2019), XP051830751, 15 pages.
International Search Report and Written Opinion—PCT/US2021/019284—ISA/EPO—dated Jun. 15, 2021.

* cited by examiner

TECHNIQUES FOR SHARING TRANSMISSION POWER DURING HANDOVER IN WIRELESS COMMUNICATIONS

CLAIM OF PRIORITY UNDER 35 U.S.C. § 119

The present application for patent claims priority to Provisional Patent Application No. 62/994,264, entitled "TECHNIQUES FOR SHARING TRANSMISSION POWER DURING HANDOVER IN WIRELESS COMMUNICATIONS" filed Mar. 24, 2020, which is assigned to the assignee hereof and hereby expressly incorporated by reference herein for all purposes.

TECHNICAL FIELD

This disclosure relates to wireless communication systems, and more particularly, to performing handover procedures.

DESCRIPTION OF THE RELATED TECHNOLOGY

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for wireless communication including a transceiver, a memory configured to store instructions, and one or more processors communicatively coupled with the transceiver and the memory. The one or more processors are configured to transmit, to a source cell, a capability indicating whether cancelling uplink transmission to the source cell in DAPS-based HO is supported, receive, from the source cell, an uplink grant scheduling a first uplink transmission during the DAPS-based HO, and where the first uplink transmission overlaps with a second uplink transmission scheduled by a target cell, cancel at least a portion of the first uplink transmission.

In some implementations, the apparatus can include where the first uplink transmission and the second uplink transmission are in overlapping time resources.

In some implementations, the apparatus can include where the one or more processors are configured to cancel at least the portion of the first uplink transmission based on a cancellation timeline.

In some implementations, the apparatus can include where the one or more processors are further configured to, where the first uplink transmission overlaps with the second uplink transmission scheduled by the target cell and where the capability indicates that cancelling uplink transmission to the source cell in DAPS-based HO is supported, transmit the second uplink transmission to the target cell.

In some implementations, the apparatus can include where the one or more processors are configured to cancel at least the portion of the first uplink transmission where the apparatus does not indicate a second capability for power sharing.

In some implementations, the apparatus can include where the one or more processors are configured to cancel at least the portion of the first uplink transmission where the apparatus does not receive an indication of power sharing.

In some implementations, the apparatus can include where the one or more processors are further configured to, where the first uplink transmission overlaps with the second uplink transmission scheduled by the target cell and where the capability indicates that cancelling uplink transmission to the source cell in DAPS-based HO is not supported, indicate, to at least the source cell, a configuration error.

In some implementations, the apparatus can include where the one or more processors are configured to indicate the configuration error where the apparatus does not indicate a second capability for power sharing.

In some implementations, the apparatus can include where the one or more processors are configured to indicate the configuration error where the apparatus does not receive an indication of power sharing.

In some implementations, the apparatus can include where the capability indicates, per band combination, whether cancelling uplink transmission to the source cell in DAPS-based HO is supported.

Another innovative aspect of the subject matter described in this disclosure can be implemented in an apparatus for wireless communication including a transceiver, a memory configured to store instructions, and one or more processors communicatively coupled with the transceiver and the memory. The one or more processors are configured to receive, from a UE, a capability indicating whether cancelling uplink transmission from a source cell in dual DAPS-based HO is supported, and where the capability indicates that cancelling uplink transmission from the source cell in DAPS-based HO is supported, scheduling, for the UE, an uplink transmission during a DAPS-based HO to a target cell.

In some implementations, the apparatus can include where the one or more processors are further configured to, where the capability indicates that cancelling uplink transmission from the source cell in DAPS-based HO is not supported, refrain from scheduling, for the UE, the uplink transmission where the uplink transmission overlaps with a second uplink transmission scheduled by a target cell for the UE during the DAPS-based HO.

In some implementations, the apparatus can include where the uplink transmission and the second uplink transmission are in overlapping time resources.

In some implementations, the apparatus can include where the one or more processors are configured to refrain from scheduling the uplink transmission where the UE transmits a second capability for power sharing.

In some implementations, the apparatus can include where the one or more processors are configured to refrain from scheduling the uplink transmission where the apparatus transmits, to the UE, an indication of power sharing.

In some implementations, the apparatus can include where the capability indicates, per band combination, whether cancelling uplink transmission to the source cell in DAPS-based HO is supported.

Another innovative aspect of the subject matter described in this disclosure can be implemented in a method for wireless communications at an apparatus of a UE including transmitting, to a source cell, a capability indicating whether cancelling uplink transmission to the source cell in DAPS-based HO is supported, receiving, from the source cell, an uplink grant scheduling a first uplink transmission during the DAPS-based HO, and where the first uplink transmission overlaps with a second uplink transmission scheduled by a target cell, cancelling at least a portion of the first uplink transmission.

In some implementations, the method can include where the first uplink transmission and the second uplink transmission are in overlapping time resources.

In some implementations, the method can include where cancelling at least the portion of the first uplink transmission is based on a cancellation timeline.

In some implementations, the method can include, where the first uplink transmission overlaps with the second uplink transmission scheduled by the target cell and where the capability indicates that cancelling uplink transmission to the source cell in DAPS-based HO is supported, transmitting the second uplink transmission to the target cell.

In some implementations, the method can include where cancelling at least the portion of the first uplink transmission is performed where the UE does not indicate a second capability for power sharing.

In some implementations, the method can include where cancelling at least the portion of the first uplink transmission is performed where the UE does not receive an indication of power sharing.

In some implementations, the method can include, where the first uplink transmission overlaps with the second uplink transmission scheduled by the target cell and where the capability indicates that cancelling uplink transmission to the source cell in DAPS-based HO is not supported, indicating, to at least the source cell, a configuration error.

In some implementations, the method can include where indicating the configuration error is performed where the UE does not indicate a second capability for power sharing.

In some implementations, the method can include where indicating the configuration error is performed where the UE does not receive an indication of power sharing.

In some implementations, the method can include where the capability indicates, per band combination, whether cancelling uplink transmission to the source cell in DAPS-based HO is supported.

Another innovative aspect of the subject matter described in this disclosure can be implemented in a method for wireless communications at an apparatus of a network including receiving, from a UE, a capability indicating whether cancelling uplink transmission from a source cell in DAPS-based HO is supported, and where the capability indicates that cancelling uplink transmission from the source cell in DAPS-based HO is supported, scheduling, for the UE, an uplink transmission during a DAPS-based HO to a target cell.

In some implementations, the method can include, where the capability indicates that cancelling uplink transmission from the source cell in DAPS-based HO is not supported, refraining from scheduling, for the UE, the uplink transmission where the uplink transmission overlaps with a second uplink transmission scheduled by a target cell for the UE during the DAPS-based HO.

In some implementations, the method can include where the uplink transmission and the second uplink transmission are in overlapping time resources.

In some implementations, the method can include where the capability indicates, per band combination, whether cancelling uplink transmission to the source cell in DAPS-based HO is supported.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
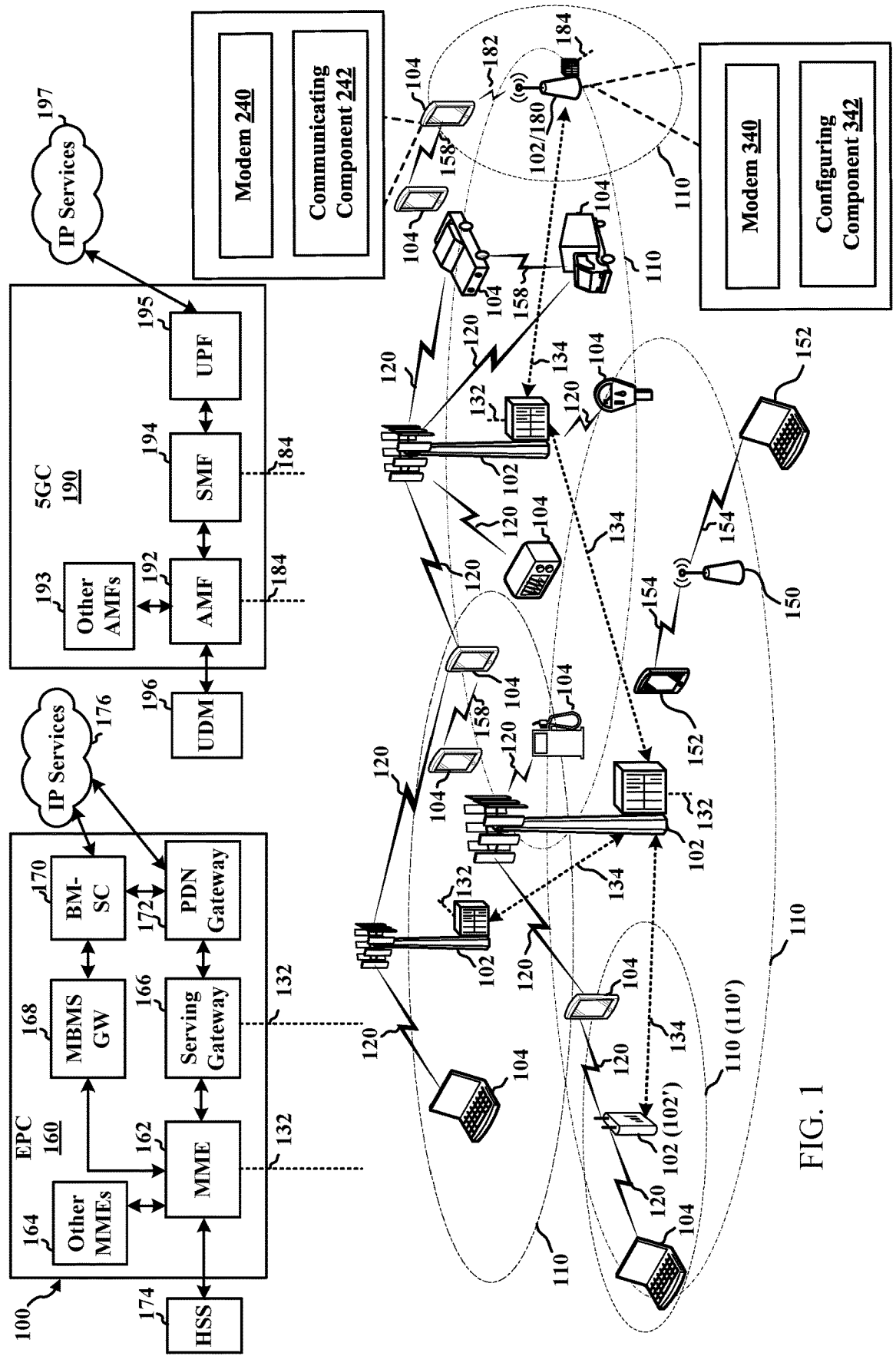
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communication technologies, such as 5G, user equipment (UEs) are able to perform handover from one cell (or corresponding gNB or cell group) to another. During handover, a dual active protocol stack (DAPS) functionality is defined to allow a UE to keep active protocol stacks between the source and target cell (or corresponding gNBs or cell groups). In DAPS-based handover, the UE can still receive data from, or transmit data to, the source cell while communicating with the target cell to complete the handover.

Aspects described herein relate to determining power sharing associated with performing a handover procedure. During a dual active protocol stack (DAPS)-based handover (HO), a user equipment (UE) can communicate with a source cell and target cell during the HO such to receive data from the source cell while concurrently communicating with the target cell to complete the HO. In this regard, the UE can maintain an active protocol stack for each of the source cell and the target cell to communicate with both cells during the HO (for example, after initiating the HO from the source cell to the target cell and for at least a period of time before the HO is completed to the target cell). Though described herein in terms of source and target cell, the UE can be communicating with a corresponding gNB or a cell group (or corresponding gNBs of a group of cells), such as a master cell group (MCG), in performing the HO. Moreover, though described herein in terms of DAPS-based HO, functionality described herein can be similarly applied to other types of handover having multiple active stacks. The UE can accordingly determine power sharing for sharing transmit power of a UE transmitter for uplink (UL) communications between the source and target cells during the DAPS-based HO. DAPS-based HO can be applicable to intra-frequency HO, intra-band inter-frequency HO (such as HO among cells of different frequency but within the same frequency band), and inter-band inter-frequency HO (such as HO among cells of different frequency within different frequency bands).

In fifth generation (5G) new radio (NR), supported power sharing modes can include semi-static power sharing mode 1, semi-static power sharing mode 2, and dynamic power sharing mode. In semi-static power mode 1, the UE can determine a transmission power for the target MCG or the source MCG, as described in third generation partnership project (3GPP) technical specification (TS) 38.213, clauses 7.1 through 7.5 using $P_{MCG}$ or $P_{SCG}$ as the maximum transmission power, respectively. In semi-static power mode 2, if at least one symbol of a slot i1 of the source MCG or of the target MCG that is indicated as uplink or flexible to a UE (such as by tdd-UL-DL-ConfigurationCommon and tdd-UL-DL-ConfigurationDedicated, if provided), overlaps with a symbol for any ongoing transmission in slot i2 of the target MCG or of the source MCG, respectively, the UE can determine a power for the transmission on the target MCG or the source MCG in slot i2 as described in 3GPP TS 38.213, clauses 7.1 through 7.5 using $P_{MCG}$ or $P_{SCG}$, respectively, as the maximum transmission power. For example, a symbol may include a orthogonal frequency division multiplexing (OFDM) symbol, single-carrier frequency division multiplexing (SC-FDM) symbol, etc., and a slot may include a collection of multiple symbols over a period of time. In semi-static power mode 2, if the symbols do not overlap, the UE can determine a transmission power for the target MCG or the source MCG, as described in 3GPP TS 38.101-3 and in 3GPP TS 38.213 Clauses 7.1 through 7.5 without considering $P_{MCG}$ or $P_{SCG}$, respectively. In dynamic power mode, if UE transmission(s) in slot $i_1$ of the target MCG overlap in time with UE transmission(s) in slot $i_2$ of the source MCG and if $\hat{P}_{MCG}^{actual}(i_1) + \hat{P}_{SCG}^{actual}(i_2) > \hat{P}_{Total}^{DAPS}$ in any portion of slot $i_2$ of the source MCG, the UE may reduce transmission power in any portion of slot $i_2$ of the source MCG so that $\hat{P}_{MCG}^{actual}(i_1) + \hat{P}_{SCG}^{actual}(i_2) \leq \hat{P}_{Total}^{DAPS}$ in all portions of slot $i_2$, where $\hat{P}_{MCG}^{actual}(i_1)$ and $\hat{P}_{SCG}^{actual}(i_2)$ are the UE transmission powers in slot $i_1$ of the target MCG and in slot $i_2$ of the source MCG, respectively, that the UE determines using $P_{MCG}$ and $P_{SCG}$, respectively.

In 5G NR, the UE can indicate its capability in UL power sharing by indicating a UplinkPowerSharingDAPS-HO as one of the values {Semi-static-mode1, Semi-static-mode2, Dynamic}, or in some examples, the UE may not provide its UL power sharing capability. In addition, in 5G NR, a source cell (or MCG) can provide UE with UL power sharing mode by UplinkPowerSharingDAPS-HO-mode as one of values {Semi-static-mode1, Semi-static-mode2, Dynamic}. The capability indications may be communicating in radio resource control (RRC) layer signaling, media access control (MAC)-control element (CE), dedicated control signaling, or using substantially any signaling between the UE and source cell (or MCG). When the UE determines that the UplinkPowerSharingDAPS-HO-mode matches UplinkPowerSharingDAPS-HO, the UE can use the corresponding power mode to perform power sharing for uplink transmissions to the source and target cells. For example, if the UE indicates UplinkPowerSharingDAPS-HO=Semi-static-mode1 and is provided UplinkPowerSharingDAPS-HO-mode=Semi-static-mode1, the UE may determine a transmission power for the target MCG or for the source MCG as described in 3GPP TS 38.213 clause 7.6.2 for NR-DC-PC-mode=Semi-static-mode1 by considering the target MCG as the MCG and the source MCG as the SCG.

According to aspects described herein, when the UE determines that the UplinkPowerSharingDAPS-HO-mode and UplinkPowerSharingDAPS-HO do not match, the UE can prioritize transmission to the target cell (such as the MCG in determining the transmit power), where prioritization can include transmitting only to the target cell and not the source cell for at least a period of time. In another example, when the UE determines that the UplinkPowerSharingDAPS-HO-mode received from the source cell and UplinkPowerSharingDAPS-HO do not match, the UE can consider this an error case.

In another example, in 5G NR, if the UE does not provide UplinkPowerSharingDAPS-HO capability indication and UE transmissions on the target cell and the source cell overlap, the UE can at least one of transmit on the target cell, or cancel the transmission to the source cell. In some aspects, cancelling the source cell transmission may not be implemented by all UEs, as it can include some complexity in UE implementation. Accordingly, in some other aspects described herein, the UE can indicate, to a source cell, a capability of whether the UE supports cancelling uplink transmissions to the source cell (such as in DAPS-based HO or otherwise). Depending on the indicated capability, where the UE is scheduled with overlapping uplink transmissions to the source cell and the target cell, the UE can either follow a defined cancellation timeline for cancelling uplink transmissions to the source cell or can consider the overlap an error case. The UE can indicate the capability per band, per band combination, per band and band combination or per band pair per band combination (or per a pair of bands per band combination).

Particular implementations of the subject matter described in this disclosure can be implemented to realize one or more of the following potential advantages. Defining behavior when the UE indicated capability for power sharing mode and the source cell indicated power sharing mode for DAPS-based HO may differ may reduce errors and improve performance. Allowing the UE to indicate its capability for cancelling uplink transmissions to a source cell where the transmissions overlap those of a target cell, which may impact whether or when the source cell schedules uplink transmissions to the UE to avoid overlap with the target cell to minimize unexpected overlap, also may reduce errors and improve performance. Thus, the UE can operate to appropriately handle the above use cases not defined in TSs for 5G NR.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, or a 5G Core (5GC) 190. The base stations 102 may include macro cells (high power cellular base station) or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining power sharing mode for DAPS-based HO, determining whether to cancel uplink transmissions to a source cell based on the power sharing mode, etc., in accordance with aspects described herein. In one example, some nodes of the wireless communication system may have a modem 340 and scheduling component 342 for scheduling uplink transmissions based on a capability indication, in accordance with aspects described herein. Though a UE 104 is shown as having the modem 240 and communicating component 242 and a base station 102 is shown as having the modem 340 and scheduling component 342, this is one illustrative example, and substantially any node or type of node may include a modem 240 and communicating component 242 or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can indicate, to a base station 102 (such as a base station 102 providing a source cell or a master cell of a source cell group), a capability for a power sharing mode and can receive an indicated power sharing mode from the base station 102. In aspects described herein, communicating component 242 can determine a functionality for transmitting or cancelling uplink communications based on whether the indicated capability and the received power sharing mode indication match. In another example, communicating component 242 can indicate, to base station 102, a capability for supporting a timeline to cancel transmissions to the base station 102 in favor of uplink transmissions to a target cell in DAPS-based HO. In this example, communicating component 242 can determine whether to cancel uplink transmissions to a source cell, provided by base station 102, or consider an error case based on the indicated capability and where uplink transmissions scheduled for the source cell overlap with uplink transmissions scheduled for the target cell in DAPS-based HO. In another example, scheduling component 342 can receive the capability indication from the UE 104 and can determine a scheduling of resources (or whether to schedule resources) for an uplink transmission during a DAPS-based HO.

Figure 2:
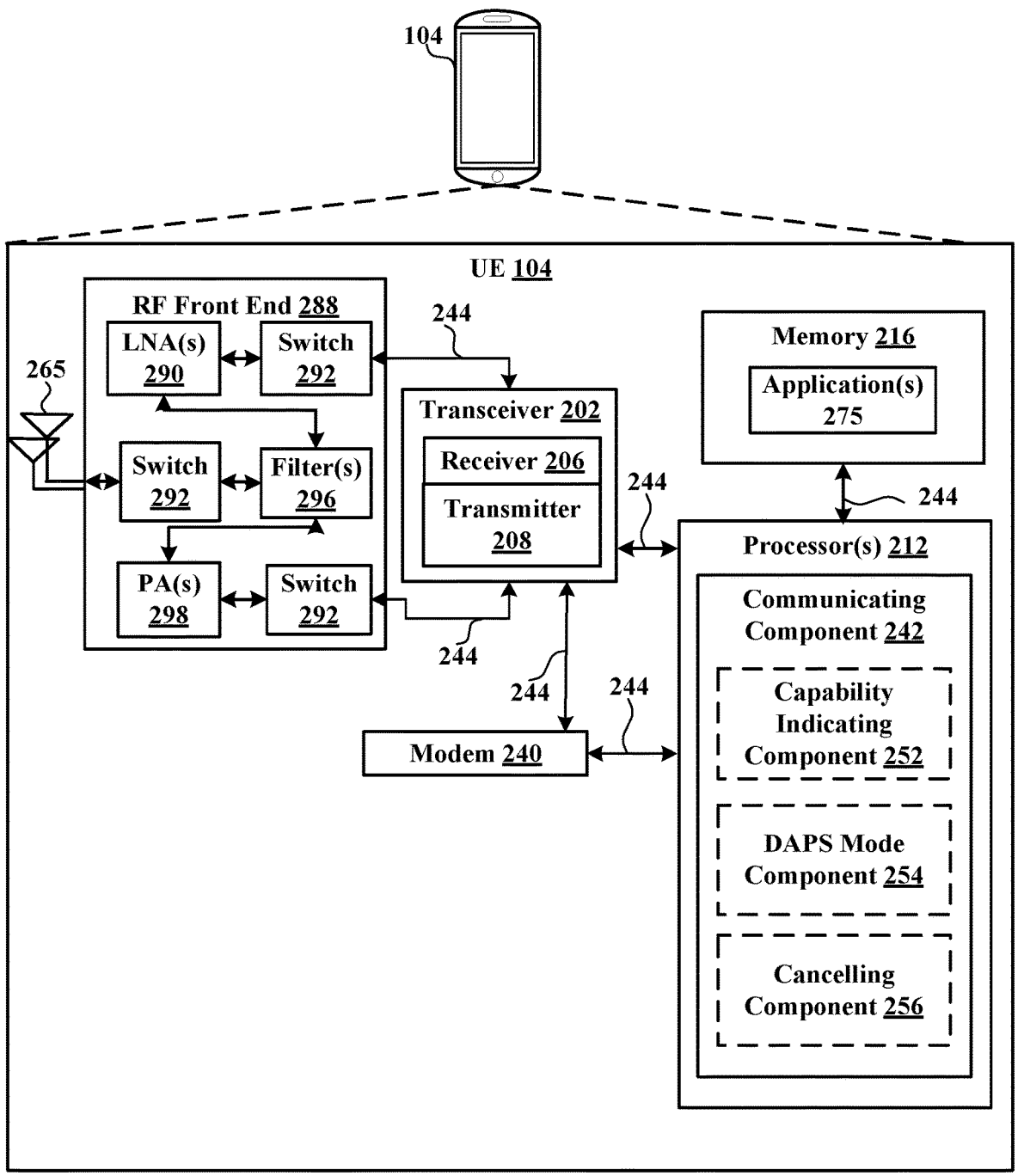
FIG. 2 illustrates an example of a user equipment (UE).
Figure 3:
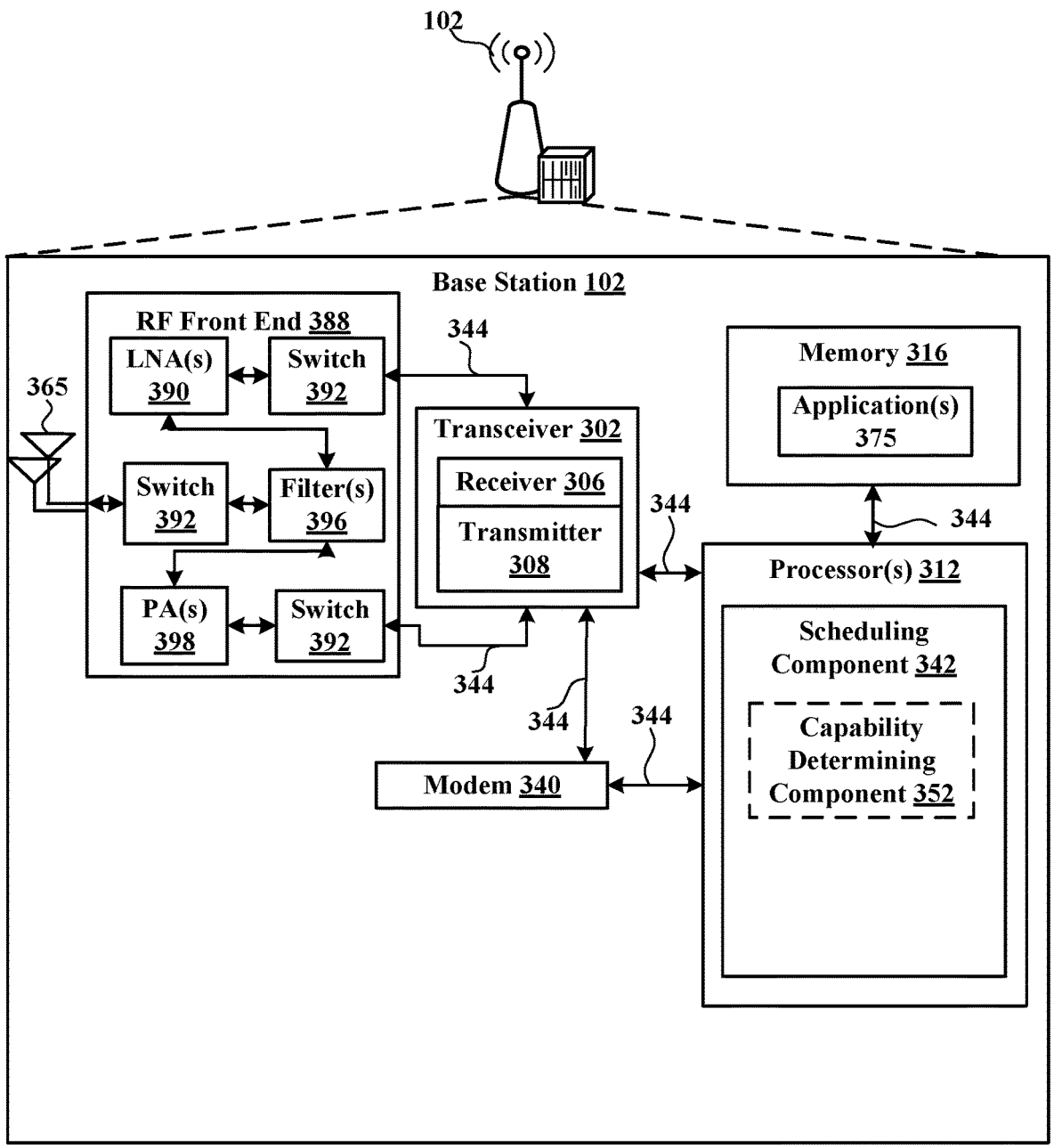
FIG. 3 illustrates an example of a base station (BS).
Figure 4:
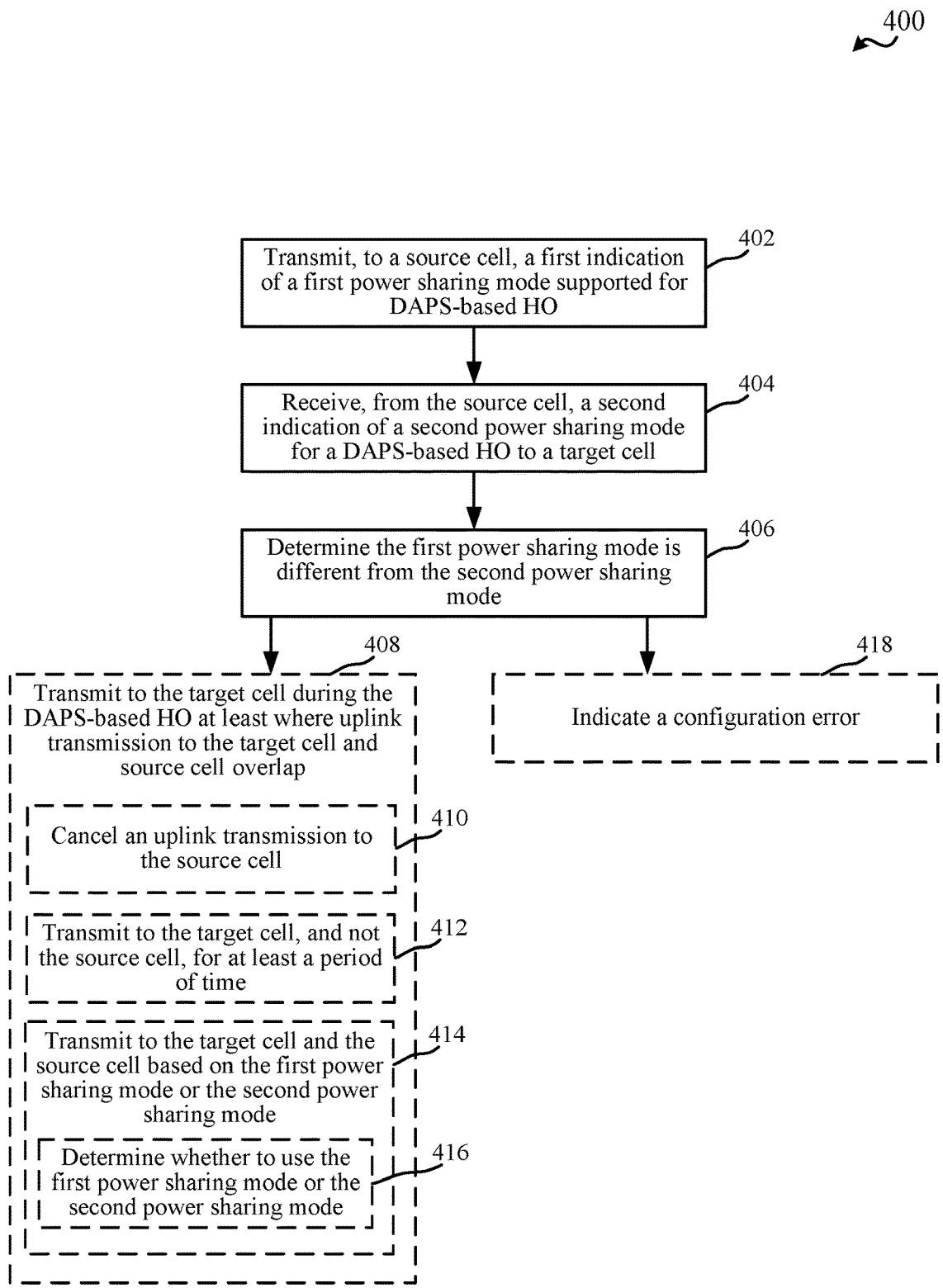
FIG. 4 illustrates an example of a flow chart for determining a power sharing mode for dual active protocol stack (DAPS)-based HO.
Figure 5:
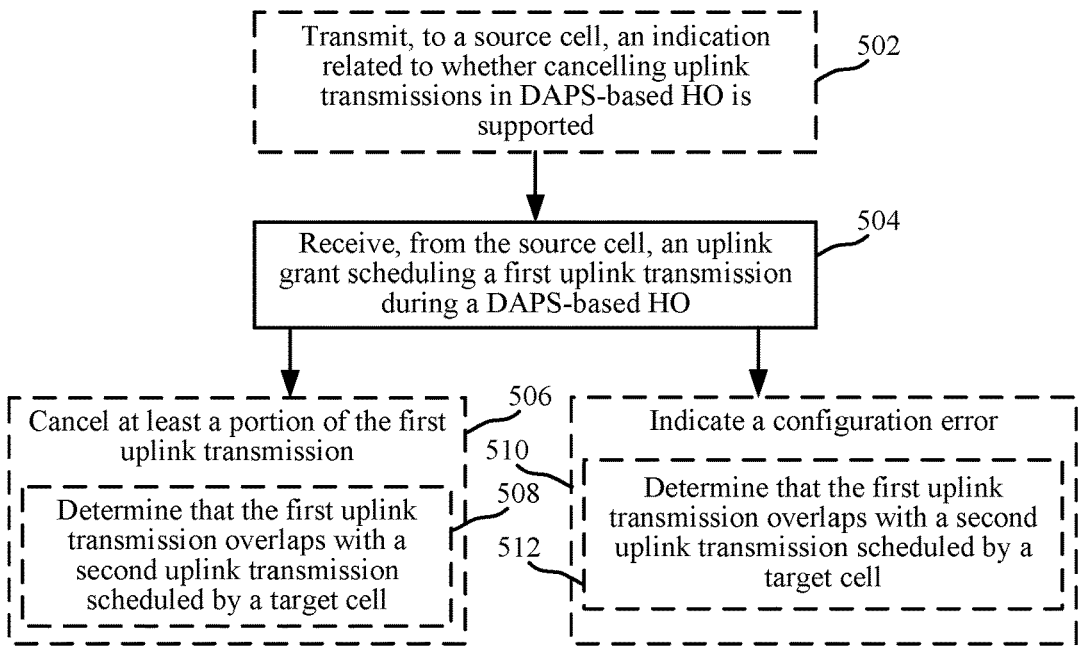
FIG. 5 illustrates an example of a flow chart for indicating a capability of whether cancelling uplink transmission in DAPS-based HO is supported.
Figure 6:
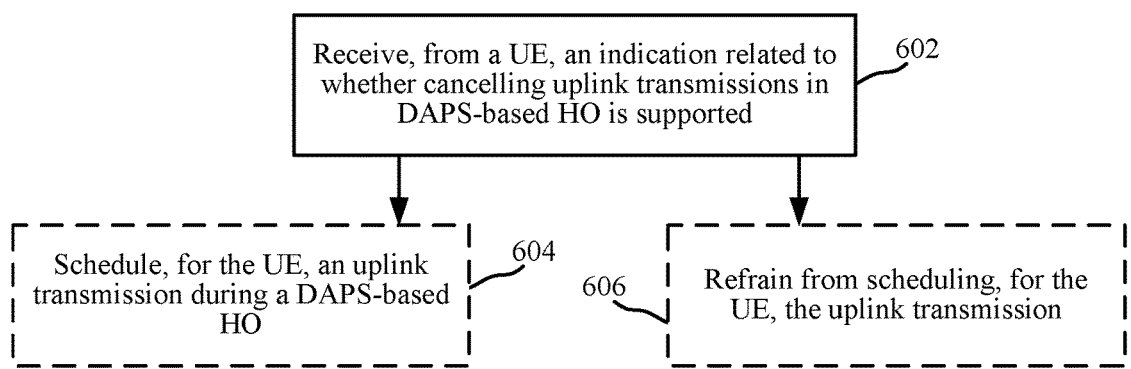
FIG. 6 illustrates an example of a flow chart for scheduling uplink transmissions based on a capability of whether cancelling uplink transmission in DAPS-based HO is supported.

Turning now to FIGS. 2-7, aspects are depicted with reference to one or more components and one or more methods that may perform the actions or operations described herein, where aspects in dashed line may be optional. Although the operations described below in FIGS. 4-6 are presented in a particular order or as being performed by an example component, it should be understood that the ordering of the actions and the components performing the actions may be varied, depending on the implementation. Moreover, it should be understood that the following actions, functions, or described components may be performed by a specially programmed processor, a processor executing specially programmed software or computer-readable media, or by any other combination of a hardware component or a software component capable of performing the described actions or functions.

FIG. 2 illustrates an example of a user equipment (UE) 104. The UE 104 may include a variety of components, some of which have already been described above and are described further herein, including components such as one or more processors 212 and memory 216 and transceiver 202 in communication via one or more buses 244, which may operate in conjunction with modem 240 or communicating component 242 for determining power sharing mode for DAPS-based HO, determining whether to cancel uplink transmissions to a source cell based on the power sharing mode, etc., as described herein.

In an aspect, the one or more processors 212 can include a modem 240 or can be part of the modem 240 that uses one or more modem processors. Thus, the various functions related to communicating component 242 may be included in modem 240 or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 or one or more of its subcomponents, or data associated therewith, when UE 104 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 or PA 298. In an aspect, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (such as RF front end 288, transceiver 202) to enable transmission or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection or cell reselection.

In an aspect, communicating component 242 can optionally include a capability indicating component 252 for indicating a capability of a power sharing mode supported for DAPS-based HO or indicating a capability for supporting a timeline for cancelling uplink transmissions to a source cell, a DAPS mode component 254 for determining a power sharing mode for DAPS-based HO, or a cancelling component 256 for cancelling uplink transmissions to a source cell based on indicated capabilities, as described herein.

In an aspect, the processor(s) 212 may correspond to one or more of the processors described in connection with the UE in FIG. 7. Similarly, the memory 216 may correspond to the memory described in connection with the UE in FIG. 7.

FIG. 3 illustrates an example of a base station 102 (or gNB 180, as described above). The base station 102 may include a variety of components, some of which have already been described above, but including components such as one or more processors 312 and memory 316 and transceiver 302 in communication via one or more buses 344, which may operate in conjunction with modem 340 and scheduling component 342 for scheduling uplink transmissions based on a capability indication, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a capability determining component 352 for determining a capability of a UE 104 to support cancellation of uplink transmissions scheduled in DAPS-based HO, in accordance with aspects described herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates an example of a flow chart 400 for determining a power sharing mode for dual active protocol stack (DAPS)-based HO. In an example, a UE 104 can perform the functions described in the flow chart 400 using one or more of the components described in FIGS. 1 and 2.

At block 402, a first indication of a first power sharing mode supported for DAPS-based HO can be transmitted to a source cell. In an aspect, capability indicating component 252, such as in conjunction with processor(s) 212, memory 216, transceiver 202, communicating component 242, etc., can transmit, to the source cell, the first indication of the first power sharing mode supported for DAPS-based HO. For example, capability indicating component 252 can transmit the indication to the source cell as part of indicating other capability information to the source cell, which may include transmitting the indication via RRC signaling, MAC-CE, dedicated control signaling, based on a request from the source cell for UE capability information, etc. Moreover, for example, the first indication may include a selection of power sharing mode from one of semi-static power sharing mode 1, semi-static power sharing mode 2, or dynamic power sharing mode, as described above.

At block 404, a second indication of a source power sharing mode for DAPS-based HO to a target cell can be received from a source cell. In an aspect, DAPS mode component 254, such as in conjunction with processor(s) 212, memory 216, transceiver 202, communicating component 242, etc., can receive, from the source cell, the second indication of the second power sharing mode for the DAPS-based HO to the target cell. In an example, DAPS mode component 254 can receive the second indication from the source cell as part of a HO procedure to handover UE 104 communications from the source cell (or source MCG) to a target cell (or target MCG), such an in a configuration or other information received at the time of handover. For example, DAPS mode component 254 can receive the configuration in RRC signaling from the source cell (such as part of the handover procedure or otherwise), MAC-CE, dedicated control signaling, etc. Moreover, for example, DAPS mode component 254 can receive the second indication from a base station (such as gNB) associated with the source cell (or source MCG). Where the first power sharing mode matches the second power sharing mode, DAPS mode component 254 can operate in the power sharing mode such to perform power sharing to share transmission power for uplink transmissions to the source cell and target cell in overlapping resources during DAPS-based HO, as described above. Moreover, for example, the second indication may include a selection of power sharing mode from one of semi-static power sharing mode 1, semi-static power sharing mode 2, or dynamic power sharing mode, as described above. For example, the uplink transmissions may be overlapping in a time domain such that the uplink transmissions can be concurrently transmitted, and the UE 104 can apply power sharing to split transmission power across each of multiple protocol stacks used to respectively transmit the uplink transmissions.

At block 406, it can be determined that the first power sharing mode is different from the second power sharing mode. In an aspect, DAPS mode component 254, such as in conjunction with processor(s) 212, memory 216, transceiver 202, communicating component 242, etc., can determine that the first power sharing mode is different from the second power sharing mode. For example, DAPS mode component 254 can determine that an enumeration value for the first power sharing mode in the first indication is different from an enumeration value for the second power sharing mode received in the second indication. In this case, the UE 104 can determine how to handle the difference in power sharing modes.

Optionally at block 408 and based on determining the difference in power sharing modes, the target cell can be transmitted to during the DAPS-based HO at least in instances where uplink transmission to the target cell and source cell overlap. In an aspect, communicating component 242, such as in conjunction with processor(s) 212, memory 216, transceiver 202, etc., can transmit to the target cell during the DAPS-based HO at least where uplink transmission to the target cell and source cell overlap. For example, communicating component 242 can determine that an uplink transmission scheduled for the source cell (such as a data transmission) and an uplink transmission scheduled for the target cell (such as part of the handover) overlap, where the overlap can be in time or frequency resources. For example, communicating component 242 can determine that the transmissions overlap where they are scheduled in overlapping time resources if the carrier frequencies for the target cell (or MCG) and the source cell (or MCG) are intra-frequency and intra-band. For example, communicating component 242 can determine that the transmissions overlap where they are scheduled in overlapping time resources and overlapping frequency resources if the carrier frequencies for the target cell (or MCG) and the source cell (or MCG) are not intra-frequency and intra-band, etc. In such examples, and where the power sharing modes do not match, communicating component 242 can determine to transmit to the target cell. For example, transmitting to the target cell can include prioritizing transmission to the target cell, which as described herein can include transmitting only to the target cell and not the source cell for at least a period of time, cancelling uplink transmissions scheduled to the source cell (or at least an overlapping portion) in favor of uplink transmissions scheduled to the target cell, etc.

In transmitting to the target cell at block 408, optionally at block 410, an uplink transmission to the source cell can be cancelled. In an aspect, cancelling component 256, such as in conjunction with processor(s) 212, memory 216, transceiver 202, communicating component 242, etc., can cancel an uplink transmission to the source cell. For example, where communicating component 242 schedules, based on a scheduling grant from the source cell, an uplink transmission to the source cell and then schedules, based on a scheduling grant from the target cell, an uplink transmission to the target cell in resources that at least partially overlap, communicating component 242 can determine to cancel, and not transmit, the uplink transmission to the source cell. In an example, cancelling component 256 can cancel the entire uplink transmission to the source cell or can cancel at least a portion of the uplink transmission to the source cell (for example, the portion that is over resources that interfere the uplink transmission scheduled for the target cell).

In transmitting to the target cell at block 408, optionally at block 412, the target cell can be transmitted to, and not the source cell, for at least a period of time. In an aspect, communicating component 242, such as in conjunction with processor(s) 212, memory 216, transceiver 202, etc., can transmit, to the target cell, and not the source cell, for at least the period of time. For example, communicating component 242 can ignore scheduling grants received from the source cell for uplink communications that correspond to this period of time, or can otherwise refrain from transmitting uplink communications to the source cell over scheduled uplink resources during this period of time. In an example, communicating component 242 can determine the period of time based on DAPS-based HO to include at least a part of the DAPS-based HO procedure. In one specific example, the period of time may include a period of time following performing a random access procedure with the target cell and until a connection is established with the target cell during the DAPS-based HO.

In transmitting to the target cell at block 408, optionally at block 414, the target cell and the source cell can be transmitted to based on the first power sharing mode or the second power sharing mode. In an aspect, communicating component 242, such as in conjunction with processor(s) 212, memory 216, transceiver 202, etc., can transmit to the target cell based on the first power sharing mode or the second power sharing mode. For example, where DAPS mode component 254 determines that the first power sharing mode and the second power sharing mode differ, it can select one of the power sharing modes to use in communicating with the target cell and source cell. In one example, the selection can be based on implementation of the UE 104 (such as instructions stored in memory 216 indicating whether to select the UE indicated or network indicated power sharing mode where they differ). In another example, the selection can be based on receiving a configuration from the network indicating which power sharing mode to prefer (such as the UE indicated power sharing mode or the network indicated power sharing mode). In these examples, optionally at block 416, it can be determined whether to use the first power sharing mode or the second power sharing mode. In an aspect, DAPS mode component 254, such as in conjunction with processor(s) 212, memory 216, transceiver 202, communicating component 242, etc., can determine whether to use the first power sharing mode or the second power sharing mode, and communicating component 242 can use the selected power sharing mode to concurrently transmit uplink communications to the target cell and the source cell, as described above.

Optionally at block 418 and based on determining the difference in power sharing modes in another example, a configuration error can be indicated. In an aspect, communicating component 242, such as in conjunction with processor(s) 212, memory 216, transceiver 202, etc., can indicate the configuration error, as the UE may not expect this configuration where the power sharing modes do not match. In an example, communicating component 242 can report the configuration error to an upper layer of the UE 104 (such as a radio link control (RLC) layer, packet data convergence protocol (PDCP) layer, application layer, etc.), can report the configuration error to the source cell, can suspend or terminate communications with the source cell based on determining the configuration error, etc.

FIG. 5 illustrates an example of a flow chart 500 for indicating a capability of whether cancelling uplink transmission in DAPS-based HO is supported. In an example, a UE 104 can perform the functions described in the flow chart 500 using one or more of the components described in FIGS. 1 and 2.

Optionally at block 502, an indication related to whether cancelling uplink transmissions in DAPS-based HO is supported can be transmitted to a source cell. In an aspect, capability indicating component 252, such as in conjunction with processor(s) 212, memory 216, transceiver 202, communicating component 242, etc., can transmit, to the source cell, the indication related to whether cancelling uplink transmissions in DAPS-based HO is supported. For example, capability indicating component 252 can transmit the indication to the source cell as part of indicating other capability information to the source cell, which may include transmitting the indication via RRC signaling, based on a request from the source cell for UE capability information, etc. In one example, the indication can be an indication that UE 104 is capable of supporting cancelling uplink transmissions to the source cell (or a corresponding timeline for cancelling uplink transmission to the source cell). In another example, the indication can be an indication that the UE 104 does not support cancelling uplink transmissions to the source cell. In either example, capability indicating component 252 may or may not transmit the indication to the source cell (such as such to indicate that the UE 104 does or does not support cancelling uplink transmissions to the source cell). In addition, for example, the capability may relate to whether the UE 104 is capable of supporting cancelling uplink transmissions to the source cell during a DAPS-based HO.

As described, in one example, if the UE 104 does not provide UplinkPowerSharingDAPS-HO and UE transmissions on the target cell and the source cell overlap, the UE may transmit only on the target cell (such that the transmission to the source cell is dropped/cancelled). The timeline for cancelling UL transmission (such as when UL transmission to the source cell is cancelled) to the source cell may be required depending on the target cell UL traffic type. The UE can have on-going UL transmission to the source cell and can receive UL scheduling for UL Tx to the target cell. If the UL scheduling for UL transmission to target cell is semi-static, the UE can know the scheduled UL a priori, and the timeline may not be necessary. On the other hand, if the UL scheduling for UL transmission to target cell is dynamic such as scheduled by downlink control information (DCI) received from the source cell, a timeline for cancelling the uplink transmission to the source cell can be used. Tracking such timeline, however, may require additional functionality to UE implementation, which all UEs may not have. Accordingly, communicating component 242 can indicate the capability or not indicate the capability, as described above and further herein.

In addition, capability indicating component 252 can indicate the capability (such as in one or more transmissions) per band, per band combination, per band and band combination, or per band pair per band combination. In an example, communicating component 242 can receive a configuration of bands that can be used for communicating with the source cell or for handover from the source cell, and capability indicating component 252 can indicate whether cancelling uplink transmission to the source cell is supported for each of multiple (or all possible) bands, per each of multiple possible band combinations, per each of multiple bands and band combinations, or band pair per band combination. For example, the band can relate to the band used by the source cell or to the band used by the target cell, and the band pair can relate to the bands used by the source cell and target cell.

At block 504, an uplink scheduling grant scheduling a first uplink transmission during a DAPS-based HO can be received from the source cell. In an aspect, communicating component 242, such as in conjunction with processor(s) 212, memory 216, transceiver 202, etc., can receive, from the source cell, the uplink grant scheduling the first uplink transmission during the DAPS-based HO. As described, during a DAPS-based HO, the source cell can schedule the UE 104 for uplink data transmissions to the source cell while the DAPS-based HO is occurring with the target cell. Based on the possibly indicated capability to cancel uplink transmissions to the source cell, however, the UE 104 may or may not expect to receive the uplink scheduling grant and may accordingly handle uplink transmissions where the uplink scheduling grant overlaps resources scheduled for transmitting to the target cell during the DAPS-based HO.

Optionally at block 506, at least a portion of the first uplink transmission can be cancelled. In an aspect, cancelling component 256, such as in conjunction with processor(s) 212, memory 216, transceiver 202, communicating component 242, etc., can cancel at least the portion of the first uplink transmission. For example, cancelling component 256 can cancel at least the portion of the first uplink transmission where at least the portion of the first uplink transmission overlaps with a second uplink transmission scheduled by a target cell during the DAPS-based HO.

Optionally in an example at block 508, it can be determined that the first uplink transmission overlaps with the second uplink transmission scheduled by the target cell. In an aspect, cancelling component 256, such as in conjunction with processor(s) 212, memory 216, transceiver 202, communicating component 242, etc. can determine the overlap based on receiving the uplink grant scheduling the first uplink transmission (such as over DCI from the source cell) or receiving an uplink grant scheduling the second uplink transmission with the target cell. Cancelling component 256 can determine that the uplink resources indicated by the uplink grant overlap uplink resources scheduled by the target cell for HO-related communications from the UE 104, where the communicating component 242 can determine the overlap to be in time resources or frequency resources. As described for example, the cancelling component 256 can determine overlap for overlapping time resources if the carrier frequencies for the target MCG and the source MCG are intra-frequency and intra-band. In another example, the cancelling component 256 can determine overlap for overlapping time resources and overlapping frequency resources if the carrier frequencies for the target MCG and the source MCG are not intra-frequency and intra-band, etc.

In one example, cancelling component 256 can cancel at least the portion of the first uplink transmission where (or based on determining that) capability indicating component 252 indicates a capability to cancel uplink transmissions in DAPS-based HO (such as in block 502). For example, where the indication relates to the UE being capable of supporting cancelling UL transmissions to the source cell, and capability indicating component 252 indicates this capability by transmission at block 502, where the first uplink transmission overlaps the second uplink transmission, cancelling component 256 can cancel (or determine to cancel) the first uplink transmission to the source cell (or at least a portion thereof, as described). Similarly, where the indication relates to the UE not supporting cancelling UL transmissions to the source cell, and capability indicating component 252 does not indicate this capability of not supporting cancelling, by transmission at block 502 (such as the UE supports cancelling), where the first uplink transmission overlaps the second uplink transmission, cancelling component 256 can cancel (or determine to cancel) the first uplink transmission to the source cell (or at least a portion thereof, as described). In either case, cancelling component 256 can follow the defined timeline for cancelling uplink transmission to the source cell.

Optionally at block 510, a configuration error may be indicated. In an aspect, communicating component 242, such as in conjunction with processor(s) 212, memory 216, transceiver 202, etc., can indicate the configuration error. For example, communicating component 242 can indicate the configuration error where at least the portion of the first uplink transmission overlaps with a second uplink transmission scheduled by a target cell during the DAPS-based HO.

Optionally in an example at block 512, it can be determined that the first uplink transmission overlaps with the second uplink transmission scheduled by the target cell. In an aspect, communicating component 242, such as in conjunction with processor(s) 212, memory 216, transceiver 202, etc. can determine the overlap based on receiving the uplink grant scheduling the first uplink transmission (such as over DCI from the source cell) or receiving an uplink grant scheduling the second uplink transmission with the target cell. In addition, for example, indicating the configuration error can be based on the capability transmitted (or not transmitted) at block 502.

For example, where the capability relates to the UE being capable of supporting cancelling UL transmissions to the source cell, and capability indicating component 252 does not indicate this capability by transmission at block 502, where the first uplink transmission overlaps the second uplink transmission, communicating component 242 can determine and indicate this scenario as the configuration error. This can be indicated as a configuration error as the UE 104, in this example, does not expect to receive uplink grants with overlapping resources. Similarly, where the capability relates to the UE not supporting cancelling UL transmissions to the source cell, and capability indicating component 252 indicates this capability of not supporting cancelling, by transmission at block 502 (such as the UE does not support cancelling), where the first uplink transmission overlaps the second uplink transmission, communicating component 242 can determine and indicate this scenario as the configuration error. This can be indicated as a configuration error as the UE 104, in this example, does not expect to receive uplink grants with overlapping resources. In an example, communicating component 242 can report the configuration error to an upper layer of the UE 104, can report the configuration error to the source cell, can suspend or terminate communications with the source cell, etc. based on determining the configuration error.

In addition, as described above in reference to FIG. 4, cancelling at least the portion of the first uplink transmission or indicating the configuration error may also be based on a supported power sharing mode transmitted by the UE 104 to the source cell, a second power sharing mode received from the source cell, etc.

FIG. 6 illustrates an example of a flow chart 600 for scheduling uplink transmissions based on a capability of whether cancelling uplink transmission in DAPS-based HO is supported. In an example, a base station 102 can perform the functions described in the flow chart 600 using one or more of the components described in FIGS. 1 and 3. For example, the base station 102 performing the functions can include a base station or gNB that provides a source cell (or MCG) to a UE 104.

At block 602, an indication related to whether cancelling uplink transmissions in DAPS-based HO is supported can be received from a UE. In an aspect, capability determining component 352, such as in conjunction with processor(s) 312, memory 316, transceiver 302, scheduling component 342, etc., can receive, from the UE (such as UE 104), the indication related to whether cancelling uplink transmissions in DAPS-based HO is supported. For example, capability determining component 352 can receive the indication from the UE as part of the UE indicating other capability information to the source cell, which may include receiving the indication via RRC signaling, based on a request from the source cell for UE capability information, etc. In one example, the indication can be an indication that UE 104 is capable of supporting cancelling uplink transmissions to the source cell (or a corresponding timeline for cancelling uplink transmission to the source cell). In another example, the indication can be an indication that the UE 104 does not support cancelling uplink transmissions to the source cell. In addition, for example, the capability may relate to whether the UE 104 is capable of supporting cancelling uplink transmissions to the source cell during a DAPS-based HO.

In addition, capability determining component 352 can receive the indication of the capability (such as in one or more transmissions) per band, per band combination, per band and band combination, or per band pair per band combination. In an example, scheduling component 342 can transmit, to the UE, a configuration of bands that can be used for communicating with the source cell or for handover from the source cell, and capability determining component 352 can receive an indication of whether cancelling uplink transmission to the source cell is supported by the UE for each of multiple (or all possible) bands, per each of multiple possible band combinations, per each of multiple bands and band combinations, or band pair per band combination. For example, the band can relate to the band used by the source cell or to the band used by the target cell, and the band pair can relate to the bands used by the source cell and target cell.

Optionally at block 604, an uplink transmission can be scheduled for the UE during a DAPS-based HO. In an aspect, scheduling component 342, such as in conjunction with processor(s) 312, memory 316, transceiver 302, etc., can schedule, for the UE, the uplink transmission during the DAPS-based HO. As described, during a DAPS-based HO, the source cell can schedule the UE 104 for uplink data transmissions to the source cell while the DAPS-based HO is occurring with the target cell. Based on the possibly indicated capability to cancel uplink transmissions to the source cell, however, the UE 104 may or may not expect to receive the uplink scheduling grant and may accordingly handle uplink transmissions where the uplink scheduling grant overlaps resources scheduled for transmitting to the target cell during the DAPS-based HO. Thus, the source cell can depend on the UE to cancel the uplink transmission where it overlaps with a second uplink transmission scheduled by the target cell that at least partially overlaps the uplink transmission scheduled by the source cell.

Optionally at block 606, scheduling, for the UE, the uplink transmission can be refrained from. In an aspect, scheduling component 342, such as in conjunction with processor(s) 312, memory 316, transceiver 302, etc., can refrain from scheduling, for the UE, the uplink transmission. Based on not receiving the indicated capability to cancel uplink transmissions to the source cell, however, the UE 104 may or may not expect to receive the uplink scheduling grant for an uplink transmission to the source cell that overlaps resources scheduled for transmitting to the target cell during the DAPS-based HO. Thus, the source cell can refrain from scheduling such uplink transmissions for the UE in this case, as described.

In addition, as described above in reference to FIG. 4, whether to schedule or refrain from scheduling the uplink transmission may also be based on a supported power sharing mode transmitted by the UE 104 to the source cell, a second power sharing mode indicated by the source cell, etc.

Figure 7:
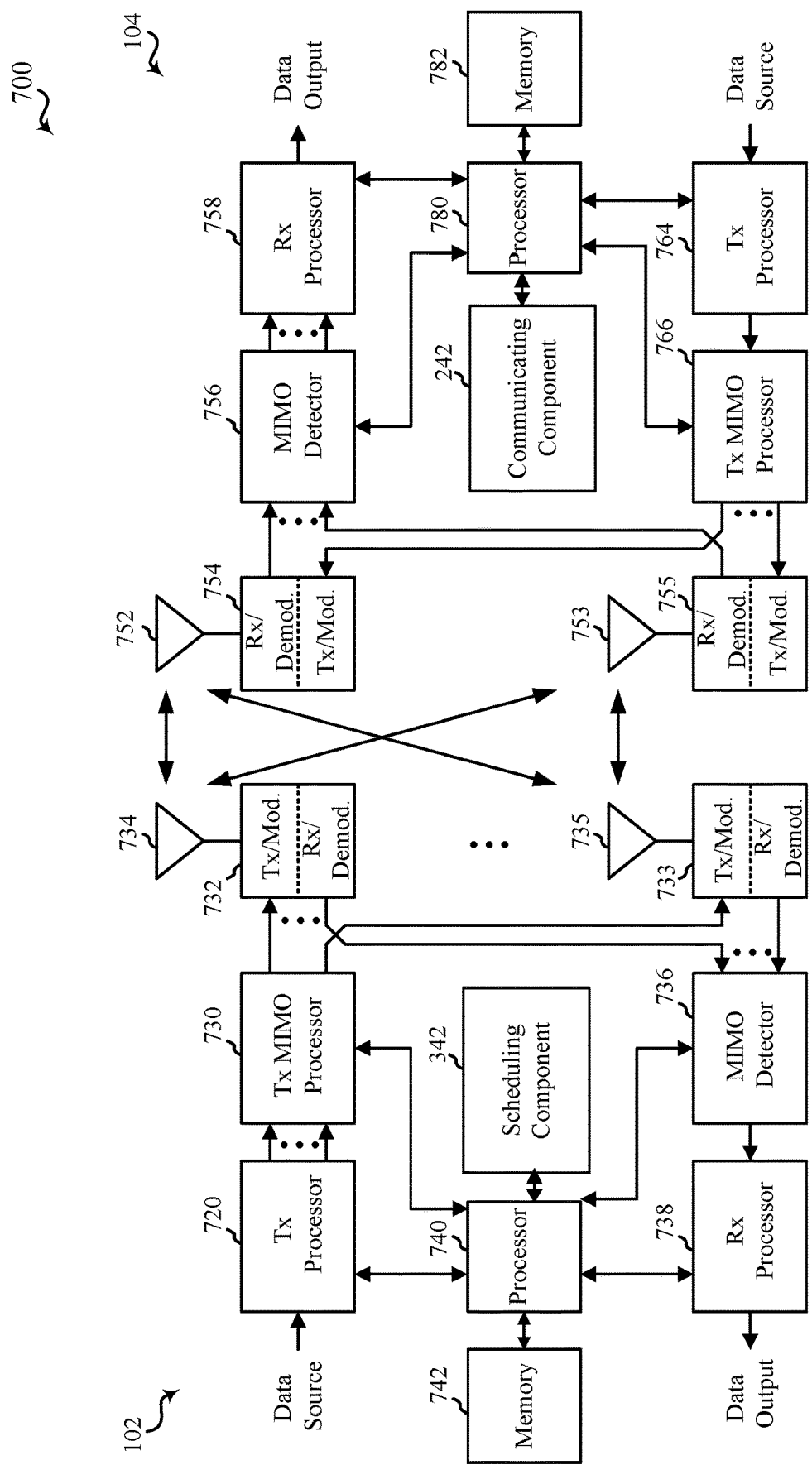
FIG. 7 illustrates a block diagram of an example of a communication system including a base station and a UE.

FIG. 7 illustrates a block diagram of an example communication system 700 including a base station 102 and a UE 104. The communication system 700 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see such as FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 342 (see such as FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The following aspects are illustrative only and aspects thereof may be combined with aspects of other implementations or teaching described herein, without limitation.

Aspect 1 is a method for wireless communications at an apparatus of a UE including transmitting, to a source cell, a first indication of a first power sharing mode supported for DAPS-based HO, receiving, from the source cell, a second indication of a second power sharing mode for a DAPS-based handover to a target cell; and based on determining that the first power sharing mode is different from the second power sharing mode, at least one of transmitting to the target cell during the DAPS-based HO if UL transmissions to the target cell and the source cell overlap; or indicating a configuration error.

In Aspect 2, the method of Aspect 1 includes where transmitting to the target cell includes transmitting to the target cell, and not the source cell, for at least a period of time following performing a random access procedure with the target cell and until a connection is established with the target cell.

In Aspect 3, the method of any of Aspects 1 or 2 includes where transmitting to the target cell includes cancelling a scheduled uplink transmission to the source cell during the DAPS-based HO.

In Aspect 4, the method of any of Aspects 1 to 3 includes where transmitting to the target cell is based on determining that the transmissions to the target cell and the source cell overlap in resources in time or frequency or both time and frequency.

In Aspect 5, the method of any of Aspects 1 to 4 includes determining, based on determining that the first power sharing mode is different from the second power sharing mode, whether to use the first power sharing mode or the second power sharing mode.

In Aspect 6, the method of Aspect 5 includes where determining whether to use the first power sharing mode or the second power sharing mode includes determining to use the first power sharing mode, and where transmitting to the target cell includes transmitting to the target cell and to the source cell based on the first power sharing mode.

In Aspect 7, the method of Aspect 5 includes where determining whether to use the first power sharing mode or the second power sharing mode includes determining to use the second power sharing mode, and where transmitting to the target cell includes transmitting to the target cell and to the source cell based on the second power sharing mode.

In Aspect 8, the method of any of Aspects 1 to 7 includes where indicating the configuration error includes reporting the configuration error to an upper layer.

Aspect 9 is a method for wireless communications at an apparatus of a UE including receiving, from a source cell, an uplink grant scheduling a first uplink transmission during a DAPS-based HO, determining that the first uplink transmission overlaps with a second uplink transmission scheduled by a target cell, and based at least in part on determining that the first uplink transmission overlaps with the second uplink transmission and on whether an indication related to whether cancelling uplink transmission in DAPS-based HO is supported is transmitted to the source cell, determining whether to cancel at least a portion of the first uplink transmission.

In Aspect 10, the method of Aspect 9 includes transmitting, to the source cell, the indication related to whether cancelling uplink transmission in DAPS-based HO is supported.

In Aspect 11, the method of Aspect 10 includes where the indication indicates that cancelling the uplink transmission to the source cell is supported, and where determining whether to cancel at least the portion of the first uplink transmission includes determining to cancel at least the portion of the first uplink transmission based on a cancellation timeline.

In Aspect 12, the method of Aspect 10 includes where the indication indicates that cancelling the uplink transmission to the source cell is not supported, and further including indicating a configuration error based at least in part on determining that the first uplink transmission overlaps with the second uplink transmission.

In Aspect 13, the method of any of Aspects 9 or 11 includes where the indication indicates that the cancelling the uplink transmission to the source cell is supported, and is not transmitted to the source cell, and further including indicating a configuration error based at least in part on determining that the first uplink transmission overlaps with the second uplink transmission.

In Aspect 14, the method of any of Aspects 9, 10, or 12 includes where the indication indicates that the cancelling the uplink transmissions to the source cell is not supported, and is not transmitted to the source cell, and where determining whether to cancel at least the portion of the first uplink transmission includes determining to cancel at least the portion of the first uplink transmission based on a cancellation timeline.

In Aspect 15, the method of any of Aspects 9 to 14 includes transmitting, to the source cell, the indication related to cancelling uplink transmission to the source cell is per band and band combination or per pair of bands per band combination.

Aspect 16 is an apparatus for wireless communication including a transceiver, a memory configured to store instructions, and one or more processors communicatively coupled with the transceiver and the memory, where the one or more processors are configured to execute the instructions to perform the operations of one or more methods in Aspects 1-15.

Aspect 17 is an apparatus for wireless communication including means for performing the operations of one or more methods in Aspects 1-15.

Aspect 18 is a computer-readable medium including code executable by one or more processors to perform the operations of one or more methods in Aspects 1-15.

Aspect 19 is an apparatus for wireless communication including a transceiver, a memory configured to store instructions, and one or more processors communicatively coupled with the transceiver and the memory. The one or more processors are configured to transmit, to a source cell, a capability indicating whether cancelling uplink transmission to the source cell in DAPS-based HO is supported, receive, from the source cell, an uplink grant scheduling a first uplink transmission during the DAPS-based HO, and where the first uplink transmission overlaps with a second uplink transmission scheduled by a target cell, cancel at least a portion of the first uplink transmission.

In Aspect 20, the apparatus of Aspect 19 includes where the first uplink transmission and the second uplink transmission are in overlapping time resources.

In Aspect 21, the apparatus of any of Aspects 19 or 20 includes where the one or more processors are configured to cancel at least the portion of the first uplink transmission based on a cancellation timeline.

In Aspect 22, the apparatus of any of Aspects 19 to 21 includes where the one or more processors are further configured to, where the first uplink transmission overlaps with the second uplink transmission scheduled by the target cell and where the capability indicates that cancelling uplink transmission to the source cell in DAPS-based HO is supported, transmit the second uplink transmission to the target cell.

In Aspect 23, the apparatus of any of Aspects 19 to 22 includes where the one or more processors are configured to cancel at least the portion of the first uplink transmission where the apparatus does not indicate a second capability for power sharing.

In Aspect 24, the apparatus of any of Aspects 19 to 23 includes where the one or more processors are configured to cancel at least the portion of the first uplink transmission where the apparatus does not receive an indication of power sharing.

In Aspect 25, the apparatus of Aspect 19 includes where the one or more processors are further configured to, where the first uplink transmission overlaps with the second uplink transmission scheduled by the target cell and where the capability indicates that cancelling uplink transmission to the source cell in DAPS-based HO is not supported, indicate, to at least the source cell, a configuration error.

In Aspect 26, the apparatus of Aspect 25 includes where the one or more processors are configured to indicate the configuration error where the apparatus does not indicate a second capability for power sharing.

In Aspect 27, the apparatus of Aspect 25 includes where the one or more processors are configured to indicate the configuration error where the apparatus does not receive an indication of power sharing.

In Aspect 28, the apparatus of any of Aspects 19 to 27 includes where the capability indicates, per band combination, whether cancelling uplink transmission to the source cell in DAPS-based HO is supported.

Aspect 29 is an apparatus for wireless communication including a transceiver, a memory configured to store instructions, and one or more processors communicatively coupled with the transceiver and the memory. The one or more processors are configured to receive, from a UE, a capability indicating whether cancelling uplink transmission from a source cell in DAPS-based HO is supported, and where the capability indicates that cancelling uplink transmission from the source cell in DAPS-based HO is supported, scheduling, for the UE, an uplink transmission during a DAPS-based HO to a target cell.

In Aspect 30, the apparatus of Aspect 29 includes where the one or more processors are further configured to, where the capability indicates that cancelling uplink transmission from the source cell in DAPS-based HO is not supported, refrain from scheduling, for the UE, the uplink transmission where the uplink transmission overlaps with a second uplink transmission scheduled by a target cell for the UE during the DAPS-based HO.

In Aspect 31, the apparatus of Aspect 30 includes where the uplink transmission and the second uplink transmission are in overlapping time resources.

In Aspect 32, the apparatus of any of Aspects 30 or 31 includes where the one or more processors are configured to refrain from scheduling the uplink transmission where the UE transmits a second capability for power sharing.

In Aspect 33, the apparatus of any of Aspects 30 to 32 includes where the one or more processors are configured to refrain from scheduling the uplink transmission where the apparatus transmits, to the UE, an indication of power sharing.

In Aspect 34, the apparatus of any of Aspects 29 to 33 includes where the capability indicates, per band combination, whether cancelling uplink transmission to the source cell in DAPS-based HO is supported.

Aspect 35 is a method for wireless communications at an apparatus of a UE including transmitting, to a source cell, a capability indicating whether cancelling uplink transmission to the source cell in DAPS-based HO is supported, receiving, from the source cell, an uplink grant scheduling a first uplink transmission during the DAPS-based HO, and where the first uplink transmission overlaps with a second uplink transmission scheduled by a target cell, cancelling at least a portion of the first uplink transmission.

In Aspect 36, the method of Aspect 35 includes where the first uplink transmission and the second uplink transmission are in overlapping time resources.

In Aspect 37, the method of any of Aspects 35 or 36 includes where cancelling at least the portion of the first uplink transmission is based on a cancellation timeline.

In Aspect 38, the method of any of Aspects 35 to 37, where the first uplink transmission overlaps with the second uplink transmission scheduled by the target cell and where the capability indicates that cancelling uplink transmission to the source cell in DAPS-based HO is supported, transmitting the second uplink transmission to the target cell.

In Aspect 39, the method of any of Aspects 35 to 38 includes where cancelling at least the portion of the first uplink transmission is performed where the UE does not indicate a second capability for power sharing.

In Aspect 40, the method of any of Aspects 35 to 39 includes where cancelling at least the portion of the first uplink transmission is performed where the UE does not receive an indication of power sharing.

In Aspect 41, the method of Aspect 35 includes where the first uplink transmission overlaps with the second uplink transmission scheduled by the target cell and where the capability indicates that cancelling uplink transmission to the source cell in DAPS-based HO is not supported, indicating, to at least the source cell, a configuration error.

In Aspect 42, the method of Aspect 41 includes where indicating the configuration error is performed where the UE does not indicate a second capability for power sharing.

In Aspect 43, the method of Aspect 41 includes where indicating the configuration error is performed where the UE does not receive an indication of power sharing.

In Aspect 44, the method of any of Aspects 35 to 43 includes where the capability indicates, per band combination, whether cancelling uplink transmission to the source cell in DAPS-based HO is supported.

Aspect 45 is a method for wireless communications at an apparatus of a network including receiving, from a UE, a capability indicating whether cancelling uplink transmission from a source cell in DAPS-based HO is supported, and where the capability indicates that cancelling uplink transmission from the source cell in DAPS-based HO is supported, scheduling, for the UE, an uplink transmission during a DAPS-based HO to a target cell.

In Aspect 46, the method of Aspect 45 includes where the capability indicates that cancelling uplink transmission from the source cell in DAPS-based HO is not supported, refraining from scheduling, for the UE, the uplink transmission where the uplink transmission overlaps with a second uplink transmission scheduled by a target cell for the UE during the DAPS-based HO.

In Aspect 47, the method of Aspect 46 includes where the uplink transmission and the second uplink transmission are in overlapping time resources.

In Aspect 48, the method of any of Aspects 45 to 47 includes where the capability indicates, per band combination, whether cancelling uplink transmission to the source cell in DAPS-based HO is supported.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication, comprising:
a memory configured to store instructions; and
one or more processors configured to execute the instructions and cause the apparatus to:
output for transmission, to a source cell, a capability indicating whether cancelling uplink transmission to the source cell in dual active protocol stack (DAPS)-based handover (HO) is supported;
obtain, from the source cell, an uplink grant scheduling a first uplink transmission during the DAPS-based HO; and
if the first uplink transmission overlaps with a second uplink transmission scheduled by a target cell, cancel at least a portion of the first uplink transmission.

2. The apparatus of claim 1, wherein the first uplink transmission and the second uplink transmission are in overlapping time resources.

3. The apparatus of claim 1, wherein the one or more processors further cause the apparatus to cancel at least the portion of the first uplink transmission based on a cancellation timeline.

4. The apparatus of claim 1, wherein the one or more processors further cause the apparatus to, if the first uplink transmission overlaps with the second uplink transmission scheduled by the target cell and where the capability indicates that cancelling uplink transmission to the source cell in DAPS-based HO is supported, output the second uplink transmission for transmission to the target cell.

5. The apparatus of claim 1, wherein the one or more processors further cause the apparatus to cancel at least the portion of the first uplink transmission where the apparatus does not indicate a second capability for power sharing.

6. The apparatus of claim 1, wherein the one or more processors further cause the apparatus to cancel at least the portion of the first uplink transmission where the apparatus does not receive an indication of power sharing.

7. The apparatus of claim 1, wherein the one or more processors further cause the apparatus to, if the first uplink transmission overlaps with the second uplink transmission scheduled by the target cell and where the capability indicates that cancelling uplink transmission to the source cell in DAPS-based HO is not supported, indicate, to at least the source cell, a configuration error.

8. The apparatus of claim 7, wherein the one or more processors further cause the apparatus to indicate the configuration error where the apparatus does not indicate a second capability for power sharing.

9. The apparatus of claim 7, wherein the one or more processors further cause the apparatus to indicate the configuration error where the apparatus does not receive an indication of power sharing.

10. The apparatus of claim 1, wherein the capability indicates, per band combination for inter-frequency DAPS-based HO, whether cancelling uplink transmission to the source cell is supported.

11. The apparatus of claim 1, further comprising a transceiver that is configured to at least one of transmit the capability or receive the uplink grant, wherein the apparatus is configured as a user equipment (UE).

12. An apparatus for wireless communication, comprising:
a memory configured to store instructions; and
one or more processors configured to execute the instructions and cause the apparatus to:
obtain, from a user equipment (UE), a capability indicating whether cancelling uplink transmission from a source cell in dual active protocol stack (DAPS)-based handover (HO) is supported; and
if the capability indicates that cancelling uplink transmission from the source cell in DAPS-based HO is supported, scheduling, for the UE, an uplink transmission during a DAPS-based HO to a target cell.

13. The apparatus of claim 12, wherein the one or more processors are further configured to, where the capability indicates that cancelling uplink transmission from the source cell in DAPS-based HO is not supported, refrain from scheduling, for the UE, the uplink transmission where the uplink transmission overlaps with a second uplink transmission scheduled by a target cell for the UE during the DAPS-based HO.

14. The apparatus of claim 13, wherein the uplink transmission and the second uplink transmission are in overlapping time resources.

15. The apparatus of claim 13, wherein the one or more processors further cause the apparatus to refrain from scheduling the uplink transmission where the UE transmits a second capability for power sharing.

16. The apparatus of claim 13, wherein the one or more processors further cause the apparatus to refrain from scheduling the uplink transmission where the apparatus transmits, to the UE, an indication of power sharing.

17. The apparatus of claim 12, wherein the capability indicates, per band combination for inter-frequency DAPS-based HO, whether cancelling uplink transmission to the source cell is supported.

18. The apparatus of claim 12, further comprising a transceiver that is configured to receive the capability, wherein the apparatus is configured as a base station.

19. A method for wireless communications at an apparatus of a user equipment (UE), comprising:
outputting for transmission to a source cell, a capability indicating whether cancelling uplink transmission to the source cell in dual active protocol stack (DAPS)-based handover (HO) is supported;
obtaining, from the source cell, an uplink grant scheduling a first uplink transmission during the DAPS-based HO; and
if the first uplink transmission overlaps with a second uplink transmission scheduled by a target cell, cancelling at least a portion of the first uplink transmission.

20. The method of claim 19, wherein the first uplink transmission and the second uplink transmission are in overlapping time resources.

21. The method of claim 19, wherein cancelling at least the portion of the first uplink transmission is based on a cancellation timeline.

22. The method of claim 19, where the first uplink transmission overlaps with the second uplink transmission scheduled by the target cell and where the capability indicates that cancelling uplink transmission to the source cell in DAPS-based HO is supported, outputting the second uplink transmission for transmission to the target cell.

23. The method of claim 19, wherein cancelling at least the portion of the first uplink transmission is performed where the UE does not indicate a second capability for power sharing.

24. The method of claim 19, wherein cancelling at least the portion of the first uplink transmission is performed where the UE does not receive an indication of power sharing.

25. The method of claim 19 further comprising, where the first uplink transmission overlaps with the second uplink transmission scheduled by the target cell and where the capability indicates that cancelling uplink transmission to the source cell in DAPS-based HO is not supported, indicating, to at least the source cell, a configuration error.

26. The method of claim 25, wherein indicating the configuration error is performed where the UE does not indicate a second capability for power sharing.

27. The method of claim 25, wherein indicating the configuration error is performed where the UE does not receive an indication of power sharing.

28. The method of claim 19, wherein the capability indicates, per band combination for inter-frequency DAPS-based HO, whether cancelling uplink transmission to the source cell is supported.

29. A method for wireless communications at an apparatus of a network, comprising:
obtaining, from a user equipment (UE), a capability indicating whether cancelling uplink transmission from a source cell in dual active protocol stack (DAPS)-based handover (HO) is supported; and
if the capability indicates that cancelling uplink transmission from the source cell in DAPS-based HO is supported, scheduling, for the UE, an uplink transmission during a DAPS-based HO to a target cell.

30. The method of claim 29, wherein the capability indicates, per band combination for inter-frequency DAPS-based HO, whether cancelling uplink transmission to the source cell is supported.

* * * * *